(12) United States Patent
Bussa et al.

(10) Patent No.: US 10,169,181 B2
(45) Date of Patent: Jan. 1, 2019

(54) EFFICIENT VALIDATION OF TRANSACTIONAL MEMORY IN A COMPUTER PROCESSOR

(71) Applicant: International Business Machines Corporation, Armonk, NY (US)

(72) Inventors: Vinod Bussa, Hyderabad (IN); Manoj Dusanapudi, Bangalore (IN); Shakti Kapoor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 15/265,939

(22) Filed: Sep. 15, 2016

(65) Prior Publication Data

US 2018/0074926 A1 Mar. 15, 2018

(51) Int. Cl.
| | |
|---|---|
| *G06F 11/00* | (2006.01) |
| *G06F 11/273* | (2006.01) |
| *G06F 11/22* | (2006.01) |
| *G06F 11/36* | (2006.01) |
| *G06F 11/263* | (2006.01) |
| *G06F 11/16* | (2006.01) |

(52) U.S. Cl.
CPC .......... *G06F 11/273* (2013.01); *G06F 11/167* (2013.01); *G06F 11/2236* (2013.01); *G06F 11/2273* (2013.01); *G06F 11/263* (2013.01); *G06F 11/3688* (2013.01)

(58) Field of Classification Search
CPC ............... G06F 11/263; G06F 11/3688; G06F 11/3684; G06F 11/167
See application file for complete search history.

(56) References Cited

U.S. PATENT DOCUMENTS

| | | | |
|---|---|---|---|
| 6,553,513 B1 * | 4/2003 | Swoboda | G06F 11/3656 |
| | | | 714/25 |
| 8,402,227 B2 | 3/2013 | Moir et al. | |
| 8,595,446 B2 | 11/2013 | Lev et al. | |
| 8,769,514 B2 | 7/2014 | Detlefs et al. | |
| 8,813,052 B2 | 8/2014 | Gray et al. | |
| 9,117,023 B2 * | 8/2015 | Hershkovitz | G06F 11/3684 |

(Continued)

OTHER PUBLICATIONS

Mehrara et al. "Parallelizing Sequential Applications on Commodity Hardware using a Low-cost Software Transactional Memory", ACM Sigplan Notices, 44(6), 166-176, 2009.

(Continued)

*Primary Examiner* — Charles Ehne
(74) *Attorney, Agent, or Firm* — Martin & Associates, LLC; Bret J. Petersen

(57) ABSTRACT

A transactional memory test tests a transactional memory system on a computer processor. A test case with a transactional memory test is constructed such that the transactional memory test proceeds further in the transaction mode if the transaction is successful. In contrast, if there is a failure of the transaction, then the transactional memory test is executed in the non-transaction state. The transactional memory test stresses both transaction success and transaction failure cases of the processor for more efficient validation of the computer processor. Also, when checking the correctness of the test case the correct result remains the same whether the transaction passes or fails to simplify verification.

17 Claims, 5 Drawing Sheets

(56) References Cited

U.S. PATENT DOCUMENTS

| | | | |
|---|---|---|---|
| 9,239,899 B2 | 1/2016 | Jose | |
| 2009/0070643 A1* | 3/2009 | Anvekar | G06F 11/263 |
| | | | 714/718 |
| 2011/0231716 A1* | 9/2011 | Prakash | G11C 29/12 |
| | | | 714/718 |
| 2017/0220442 A1* | 8/2017 | Dusanapudi | G06F 11/263 |

OTHER PUBLICATIONS

Baugh et al., "Using Hardware Memory Protection to Build a High-Performance, Strongly-Atomic Hybrid Transactional Memory", ACM SIGARCH Computer Architecture News, 36(3), 115-126, 2008.

\* cited by examiner

EFFICIENT VALIDATION OF TRANSACTIONAL MEMORY IN A COMPUTER PROCESSOR

BACKGROUND

1. Technical Field

This disclosure generally relates to computer hardware testing and development, and more specifically relates to a system and method for efficient validation of transactional memory in a computer processor.

2. Background Art

Processor testing tools attempt to generate the most stressful test case for a processor. In theory, the generated test cases should provide maximum test coverage and should be able to stress various timing scenarios on the processor, including the memory. Building test cases can be extremely costly in time and resources such that building efficient test cases is an important part of processor testing.

Transactional memory is used to simplify concurrent programming by allowing a group of load and store instructions to execute in an atomic way. A transactional memory system transparently supports the definition of regions of code that are considered a transaction. Transactional memory may be supported in hardware or software. A processor that supports hardware transactional memory needs to be tested and validated at the device level to insure the processor's hardware properly handles transactional memory operations including checkpoint of the pre-transaction state and restoring the state of the processor in case of failure or any other abort of the transaction.

BRIEF SUMMARY

The disclosure and claims herein relate to a system and method for testing a transactional memory system on a computer processor. A test case with a transactional memory test is constructed such that the transactional memory test proceeds further in the transaction mode if the transaction is successful. In contrast, if there is a failure of the transaction, then the transactional memory test is executed in the non-transaction state. The transactional memory test stresses both transaction success and transaction failure cases of the processor for more efficient validation of the computer processor. Also, when checking the correctness of the test case the correct result remains the same whether the transaction passes or fails to simplify verification.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Some computer processor systems include a transactional memory system. A transactional memory system transparently supports defining a region of code that is considered a transaction. Thus a transaction is a group of instructions that collectively have unique storage access to a section of memory called transactional memory. The purpose of the transaction is to facilitate parallel programming. The processor architecture does not guarantee that a transaction will be successful. If a transaction fails, the processor should leave the state of the transactional memory as if all instructions that are part of the transaction were never executed. If the transaction succeeds, the transaction appears to execute as an atomic unit as viewed by other processors and mechanisms. Some computer processors support nested levels of transactions. A processor that supports hardware transactional memory needs to be tested and validated at the device level to insure the processor's hardware properly handles transactional memory operations including checkpoint of the pre-transaction state and restoring the state of the processor in case of failure or any other abort of the transaction.

The disclosure and claims herein relate to a system and method for testing a transactional memory system on a computer processor. A test case with a transactional memory test is constructed such that the transactional memory test proceeds further in the transaction mode if the transaction is successful. In contrast, if there is a failure of the transaction, then the transactional memory test is executed in the non-transaction state. The transactional memory test stresses both transaction success and transaction failure cases of the processor for more efficient validation of the computer processor. Also, when checking the correctness of the test case the correct result remains the same whether the transaction passes or fails to simplify verification.

Figure 1:
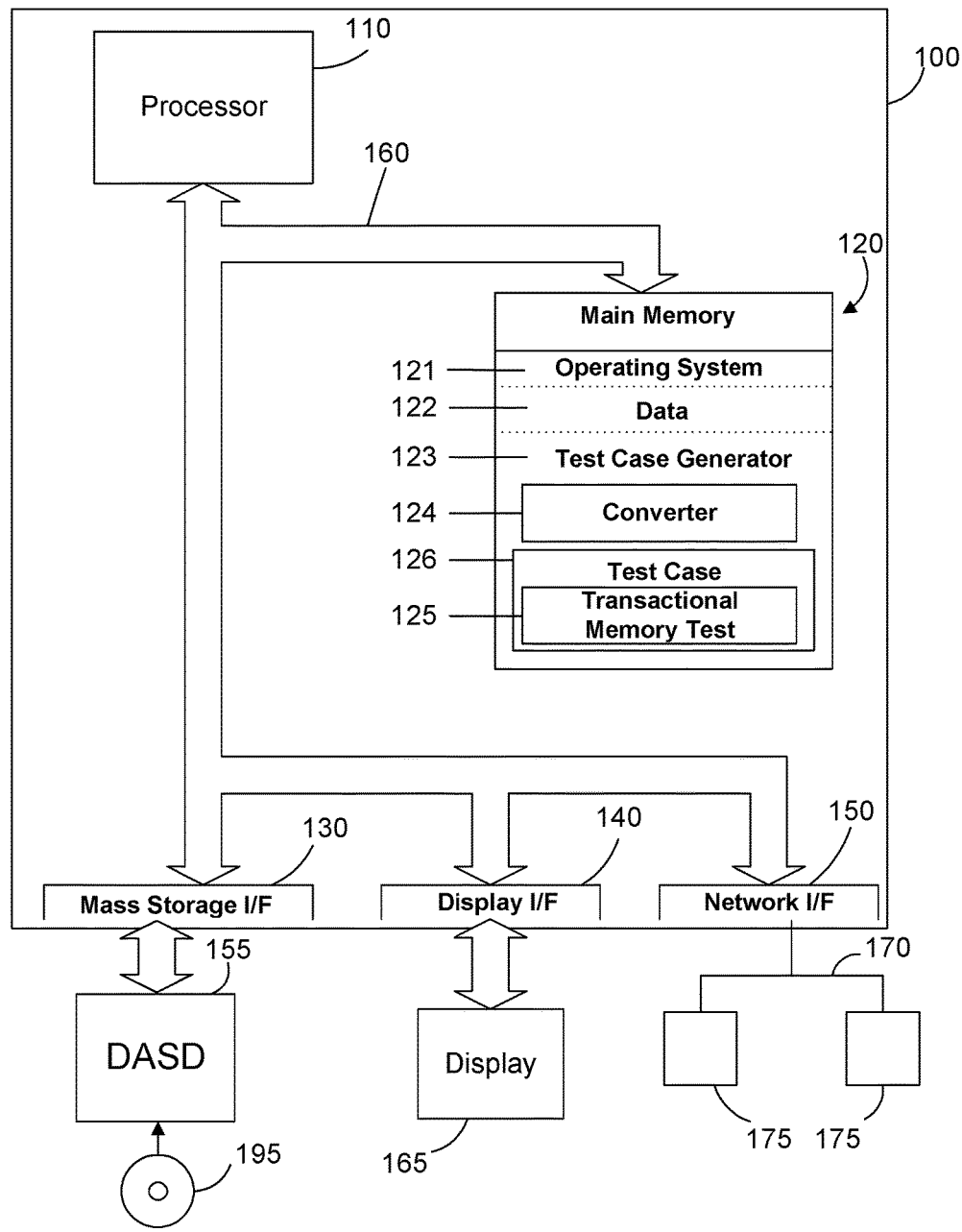
FIG. 1 is a block diagram a computer system with a test case generator as described herein to generate a test case for testing a transactional memory system on a computer processor.

Referring to FIG. 1, a computer system 100 is one suitable implementation of a computer system that is capable of performing the computer operations described herein including a test case generator for generating test cases for verifying and validating a processor design. Computer system 100 is a computer which can run multiple operating systems including the IBM i operating system. However, those skilled in the art will appreciate that the disclosure herein applies equally to any computer system, regardless of whether the computer system is a complicated multi-user computing apparatus, a single user workstation, laptop, phone or an embedded control system. As shown in FIG. 1, computer system 100 comprises one or more processors 110. The computer system 100 further includes a main memory 120, a mass storage interface 130, a display interface 140, and a network interface 150. These system components are interconnected through the use of a system bus 160. Mass storage interface 130 is used to connect mass storage devices with a computer readable medium, such as direct access storage devices 155, to computer system 100. One specific type of direct access storage device 155 is a readable and writable CD-RW drive, which may store data to and read data from a CD-RW 195. Some devices may have a removable memory card or similar for a direct access storage device 155 instead of the CD-RW drive.

Main memory 120 preferably contains an operating system 121. Operating system 121 is a multitasking operating system known in the industry as IBM i; however, those skilled in the art will appreciate that the spirit and scope of this disclosure is not limited to any one operating system. The memory 120 further includes data 122 and a test case generator 123. The memory 120 also includes a converter 124 and a transactional memory test 125 which is typically created by the test case generator 123 with input from a programmer or user. The transactional memory test 125 may be a portion of a test case 126.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while operating system 121, data 122, test case generator 123, converter 124, transactional memory test 125 and test case 126 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the test case generator 123 to generate the transactional memory test 124 as directed by a user.

Although computer system 100 is shown to contain only a single processor and a single system bus, those skilled in the art will appreciate that the test case generator may be practiced in a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
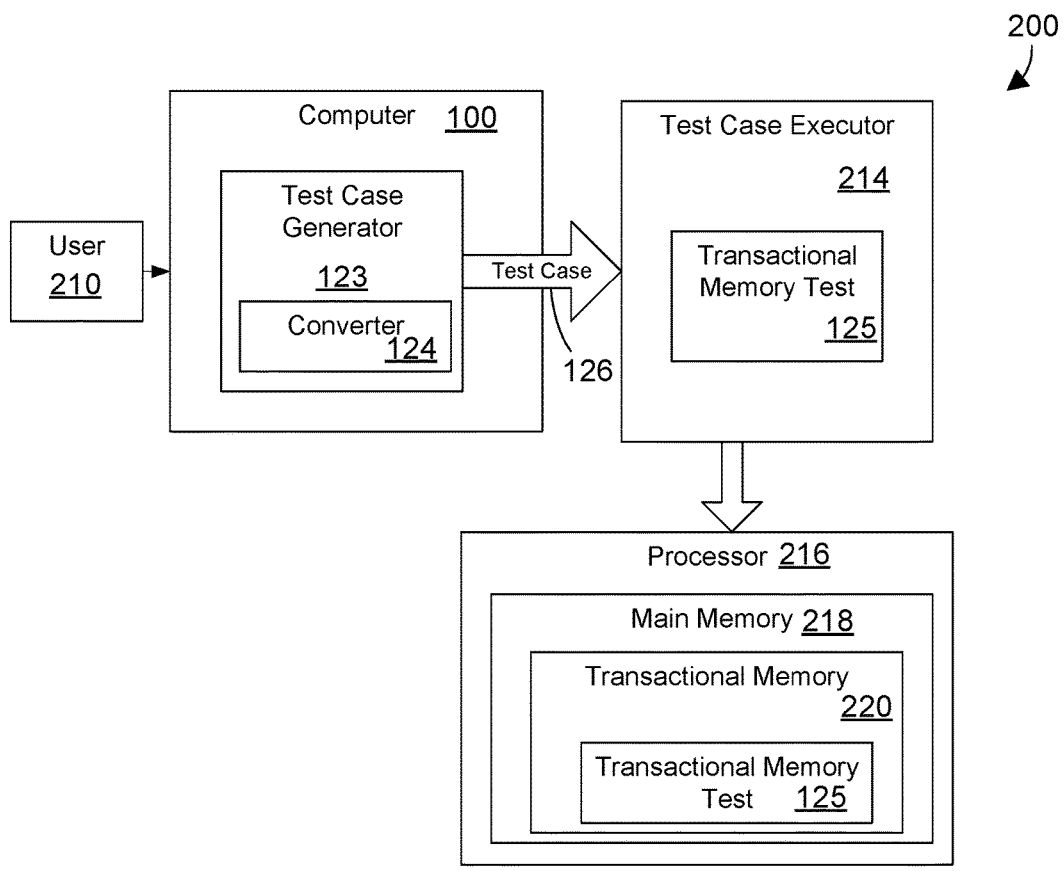
FIG. 2 is a simplified block diagram of a system for testing a transactional memory system on a computer processor.

FIG. 2 illustrates a simplified block diagram of a system 200 for testing a transactional memory system on a computer processor. A user 210 or an operator uses the test case generator 123 and the converter 124 to provide a test cases 126 to a test case executor 214. The test case generator 123 and the test case executor 214 operate in a manner similar to the prior art except as described herein. The test case 126 includes a transactional memory test 125 as described herein. Thus the transaction memory test 125 is a test case or a part of a test case that operates as described herein. The test case executor 214 loads the transactional memory test 125 into a processor 216 to verify and validate the processor design. The transactional memory test 125 is placed in the processor 216 and executed to verify the transactional memory 220 and the associated error handling hardware (not shown) of the transactional memory as described further below.

Figure 3:
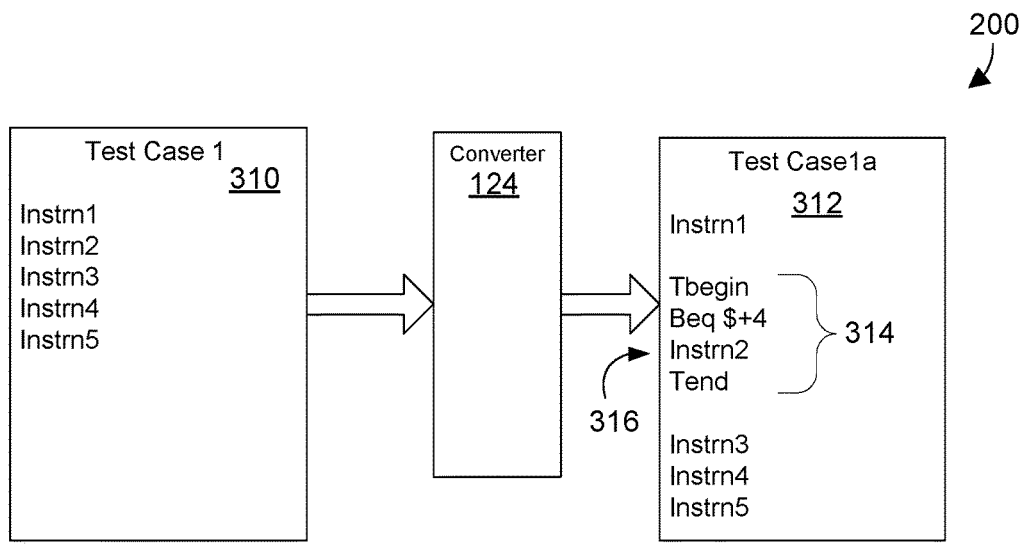
FIG. 3 is a simplified example of a test case being converted for testing a transactional memory system on a computer processor as described herein.

FIG. 3 is a simplified example of a test case being converted for testing a transactional memory system on a computer processor. In this example, test case 1 310 is a simplified test case that is generated using the test case generator 123 (FIG. 1). Test case 1 310 has five instructions that represent the test code of the test case. The converter 124 can be used to generate a transactional memory version of the test case shown as test transactional memory test case 1a 312. The converter 124 is a piece of software that adds transactional memory instructions around the test code of an input test case. In this example, the converter 124 adds transactional memory instructions 314 around instrn2 316. In this example, the added transactional memory instructions 314 include "Tbegin", "Beq $+4" and "Tend". The "Tbegin" instruction indicates the beginning of a transaction. The "Tend" indicates the end of a transaction. The "Beq $+4" instruction is placed after the "Tbegin" instruction and indicates to branch to "Instrn2" in a non-transaction mode when there is a failure of the transaction as described below.

Execution of a transaction may be a success or failure depending on what is happening in the system. A transaction failure typically occurs when multiple software routines are trying to access the transactional memory simultaneously. In a typical prior art computer processor, when a transaction fails program control is redirected to the instruction that follows the Tbegin. The status of the transaction may be stored in a condition register of the processor hardware. The "beq" instruction indicates to check the condition of this register, and if there is a failure it will take the branch otherwise it will go to next instruction. In the prior art, typically the "beq" instruction after the "Tbegin" branches control to a failure handler that is associated with the transaction. In contrast, in this example, "Beq $+4" is an instruction that branches to the next instruction in the case of a failure in the transaction. The "$+4" of this instruction indicates to branch forward 4 bytes from the current instruction. In this example, four bytes is the size of an instruction. Thus, the instruction "Beq $+4" means we make the branch ahead four bytes if there is a failure and go to the next instruction. Thus regardless of the failure or success of the transaction the test case will just go to next instruction.

Figure 4:
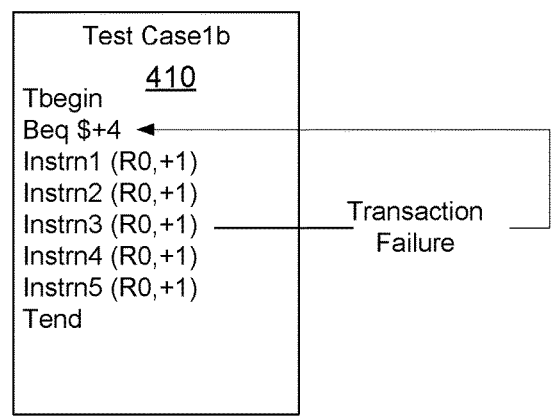
FIG. 4 illustrates another example test case for testing a transactional memory system on a computer processor.

When a transaction fails, in addition to branching to the instruction following the Tbegin statement, the processor should leave the state of the transactional memory as if all instructions that are part of the transaction were never executed. If restoring the context of the processor is not done properly then there is an error or failure of the processor. The transactional memory test is attempting to detect if such a processor error occurs when there is a transaction failure. The transactional memory test as described herein branches to execute the entire memory transaction test in the non-transaction mode if there is a failure of the transaction. Typically, the transaction memory test will branch to the beginning of the code of the transaction memory test when there is a transaction failure. The transaction memory test is thus designed such that after transaction failure, when hardware automatically jumps to a failure handler, the test executes the entire transaction code from the beginning of the transaction memory test but this time in the non-transaction mode. FIG. 4 illustrates an example and is described herein below.

In the previous example, the branch instruction "beq $+4" indicated to branch four bytes to the next instruction. In other examples, this transactional memory instruction may generally indicate any suitable branch location to execute code of the transactional memory test in a non-transaction mode when there is a failure of the transaction.

FIG. 4 illustrates another example for testing a transactional memory system on a computer processor. In this example test case 1b 410 may also be generated from test case 1 310. In this example, the transactional memory instructions are placed around all five instructions of the test case 1 310 resulting in test case 1b 410 as shown. The flow of this test case will now be described. "Tbegin" starts the transaction. Since there is no failure yet, the "beq" instruction jumps to the next instruction and continues with instructions of the transaction. In this example, each of the five instructions are "R0,+1", which indicates to add one to register R0. It is assumed that R0 is initially zero. At instrn3 we assume there is a conflict from other thread, meaning another computer software entity or thread may be simultaneously trying to modify same memory, causing the transaction to fail. As discussed above, when there is a transaction failure, the hardware will jump to the instruction after the transaction start instruction. So program flow will jump to the beq instruction. In this case, the beq instruction includes the "$+4" as described above. This causes program flow to go to next instruction and start executing. At this point, the test case 1b is executing instructions in non-transactional mode now because it skipped the transaction start. Thus, non-transactional mode means the memory transaction test is executing normally and not as a transaction. Similarly, transactional mode means the test code of the memory transaction test is executing as a transaction.

Again referring to FIG. 4, when a transaction failure occurs, the hardware restores context of the processor to the place where the transaction started. This means that the hardware attempts to restore the context of the processor and memory such that no instructions of the transaction were ever executed. In the example shown in FIG. 4, this means that the register R0 should be returned back to zero. So if the hardware correctly restores the context of the processor, after re-executing the five instructions in the non-transactional mode the register R0 will equal the number five. This means that the result of the test case 1b should be the same, number 5, whether the transaction passes or fails when the processor properly executes the transaction, including restoring the context of the processor if there is a transaction failure. Thus the test case can be checked against the same result regardless of the mode of operation or failure. In the above example, if the result is not 5, then the hardware did not properly restore the context and the transactional memory test would then report an error for the processor being tested. This can simplify the test code and increase efficiency of the test system.

In the transactional memory test described herein, a single transaction, multiple transactions, nested transactions or multiple nested transactions may be built as part of the test case included in the work load such that the result of the test case remains same. The simpler transactional memory test is easier to debug and more efficient. Further, in contrast to prior art test cases, the transactional memory test described above does not require a loop within the transaction to insure the transactional memory test completes a successful transaction. With the removal of this loop, the transaction hardware can be more thoroughly tested without slowing the system for the loops as used previously.

Figure 5:
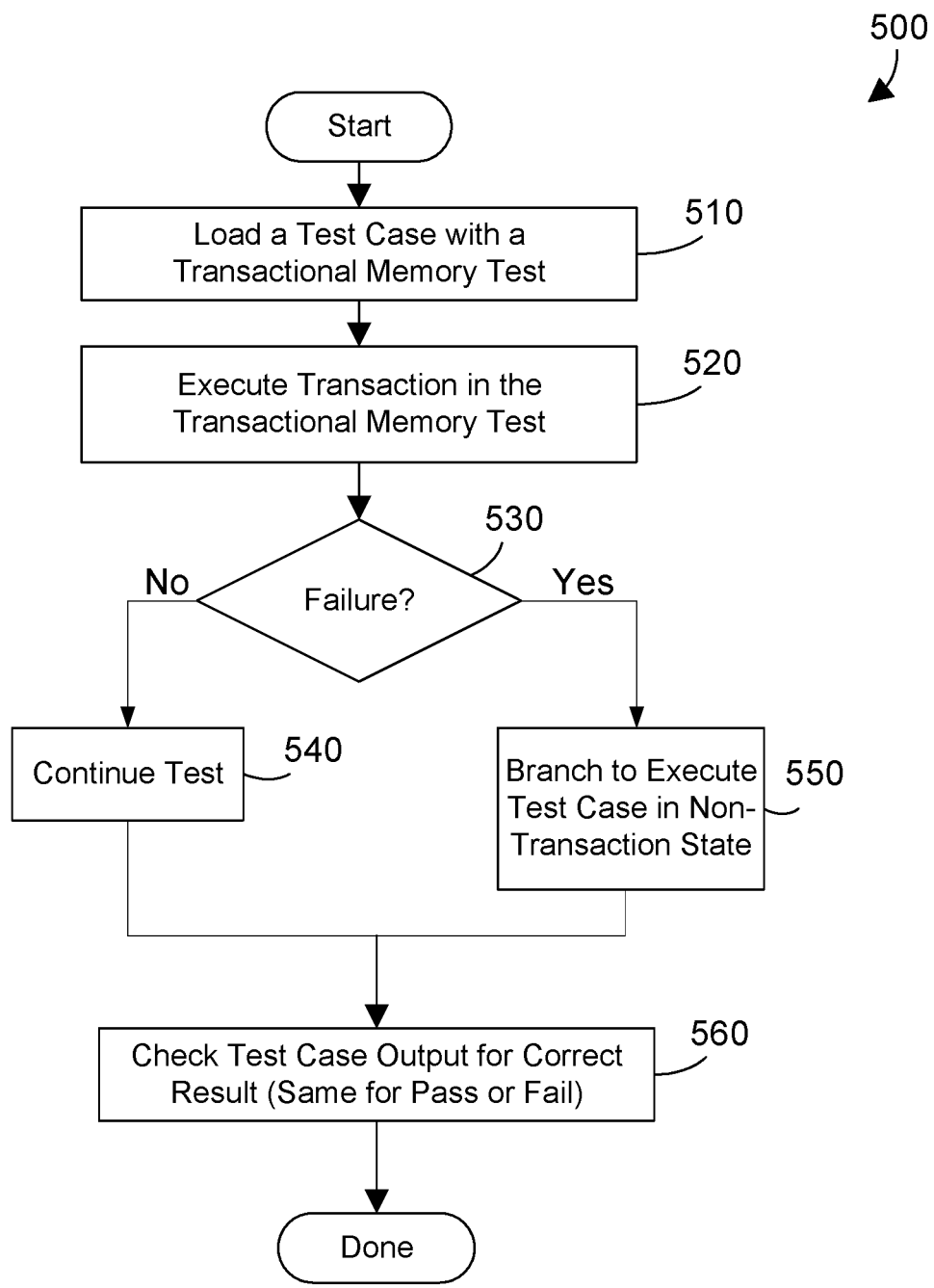
FIG. 5 is a flow diagram of a method for testing a transactional memory system on a computer processor.

Referring to FIG. 5, a method 500 shows one suitable example for testing a transactional memory system on a computer processor. Portions of method 500 are preferably performed by the converter 124 shown in FIG. 1, the test case executor 214 shown in FIG. 2 and the transactional memory test 125 shown in FIG. 1. First, load a transactional memory test into a processor (step 510). Next, execute the transaction in the transactional memory test (step 520). Determine if there is a failure of the transaction (step 530). If there is no failure (step 530=no) then continue the test case (step 540) and go to step 560. If there is a failure (step 530=yes) then execute the test case code in non-transaction state (step 550) and go to step 560. Check the test case output for a correct result where the correct result is the same for pass or fail of the transaction (step 560). Method 500 is then done.

Figure 6:
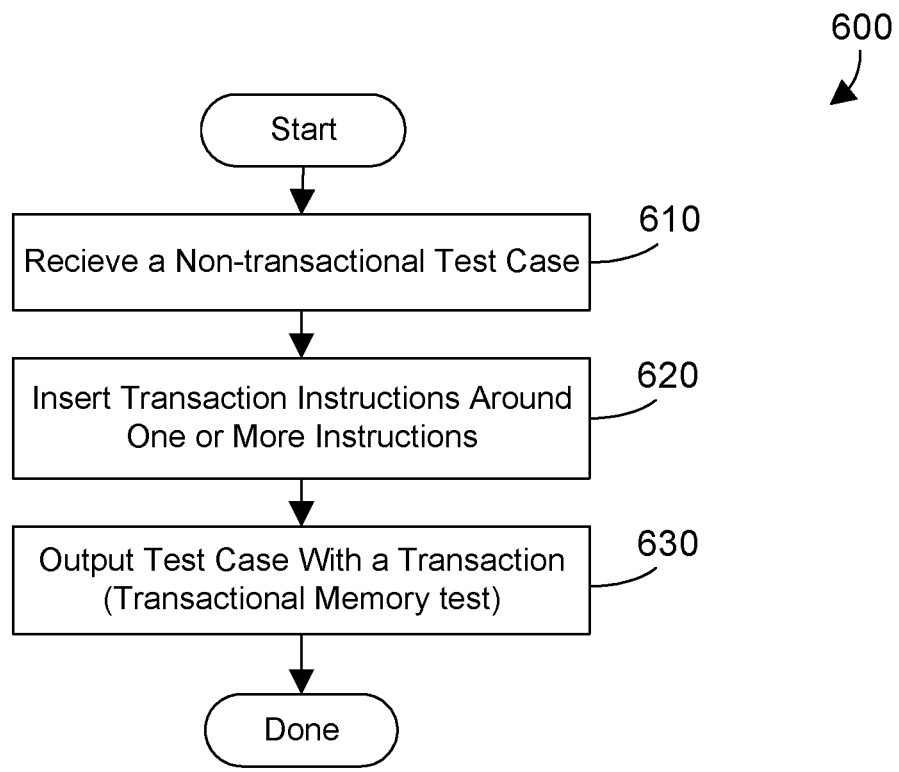
FIG. 6 is a flow diagram of a method for converting a conventional test case to a test case as described herein for testing a transactional memory system of a computer processor.

Referring to FIG. 6, a method 600 shows one suitable example for creating a transactional memory test. First, input a test case (step 610). Then insert transactional instructions around one or more instructions of the input test case (step 620). Output a test case with a transaction (step 630). The method 600 is then done. Method 600 in FIG. 6 generally describes the method for generating a test case that has a transaction from a test case that does not have a transaction, as shown in FIG. 3.

The disclosure and claims herein relate system and method for testing a transactional memory system on a computer processor to stress both transaction success and transaction failure cases using the same test code and test result. The work load is constructed such that the code in the transactions proceeds further into the workload if the result is successful. If the result is a failure, then the transaction would execute the test code of the transaction in the non-transaction state.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus for testing a computer processor comprising:
   a processor with a memory and hardware to support a memory transaction;
   a test case executor that loads a transactional memory test into the memory of the processor, wherein the transactional memory test includes a transactional memory instruction that indicates to branch and execute code of the transactional memory test in a non-transaction mode when there is a failure of the transaction and after the hardware has attempted to restore the context of the processor to a state before the transaction.

2. The apparatus of claim 1 wherein the transactional memory instruction further indicates to branch forward to a next instruction immediately following the transactional memory instruction in the transactional memory test.

3. The apparatus of claim 1 wherein the transactional memory test further comprises a transaction begin instruction, and a transaction end instruction.

4. The apparatus of claim 3 wherein the transactional memory instruction follows the transaction begin instruction and is executed by the processor hardware when a transaction failure occurs.

5. The apparatus of claim 1 further comprising:
a test case generator that creates a test case; and
a converter that creates the transactional memory test from the test case by adding transaction instructions around one or more instructions of the test case.

6. The apparatus of claim 5 wherein the transactional memory test does not include a loop for multiple trials to complete a successful transaction.

7. A method for testing a computer processor comprising:
loading a test case with a transactional memory test having a transaction;
executing the transaction in the transactional memory test;
when there is no failure of the transaction then continuing with the transaction memory test; and
when there is a failure of the transaction and after the hardware has attempted to restore the context of the processor to a state before the transaction, then branching to execute the transaction memory test in a non-transaction mode.

8. The method of claim 7 further comprising checking the test case output for a correct result, where the correct result is the same when there is a transaction failure and when there is no transaction failure.

9. The method of claim 7 further comprising:
receiving a non-transaction test case;
inserting transaction instructions around one or more instructions of the non-transaction test case to define a transaction; and
outputting the transactional memory test that defines the transaction.

10. The method of claim 7 wherein the transactional memory test includes a transactional memory instruction that indicates to branch forward to a next instruction immediately following the transactional memory instruction in the transactional memory test.

11. The method of claim 10 wherein the transactional memory test further comprises a transaction begin instruction, and a transaction end instruction.

12. The method of claim 11 wherein the transactional memory instruction follows the transaction begin instruction and is executed by the processor hardware when a transaction failure occurs.

13. The method of claim 7 wherein the transactional memory test does not include a loop for multiple trials to complete a successful transaction.

14. A method for testing a computer processor comprising:
receiving a non-transaction test case;
inserting transaction instructions around one or more instructions of the non-transaction test case to define a transaction;
outputting a test case with a transactional memory test with the transaction;
loading the test case with the transactional memory test into a computer processor;
executing the transaction in the transactional memory test;
when there is no failure of the transaction then continuing with the test case; and
when there is a failure of the transaction and after the hardware has attempted to restore the context of the processor to a state before the transaction, then branching to execute the transaction memory test in a non-transaction mode;
wherein the transactional memory test branches to execute the transaction memory test in a non-transaction mode with a transactional memory instruction that indicates to branch forward to a next instruction immediately following the transactional memory instruction; and
checking the test case output for a correct result, where the correct result is the same when there is a transaction failure and when there is no transaction failure.

15. The method of claim 14 wherein the transactional memory test further comprises a transaction begin instruction, and a transaction end instruction.

16. The method of claim 15 wherein the transactional memory instruction follows the transaction begin instruction and is executed by the processor hardware when a transaction failure occurs.

17. The method of claim 16 wherein the transactional memory test does not include a loop for multiple trials to complete a successful transaction.

* * * * *